United States Patent [19]

Meuschke et al.

[11] 4,106,983
[45] Aug. 15, 1978

[54] THERMOCOUPLE HOT JUNCTION RECEPTACLE FOR A NUCLEAR REACTOR

[75] Inventors: Robert E. Meuschke, Penn Hills Township, Allegheny County, Pa.; Jose M. Martinez, Miami, Fla.

[73] Assignee: Westinghouse Electric Corp., Pittsburgh, Pa.

[21] Appl. No.: 649,182

[22] Filed: Jan. 15, 1976

[51] Int. Cl.² ............................................. G21C 17/02
[52] U.S. Cl. .................................................. 176/19 R
[58] Field of Search ................ 176/19; 136/230, 231, 136/232, 242, 234; 73/343 R, 359

[56] References Cited

U.S. PATENT DOCUMENTS

| | | | |
|---|---|---|---|
| 1,979,085 | 10/1934 | Vollrath | 73/359 |
| 2,450,871 | 10/1948 | Adair | 136/230 |
| 2,815,663 | 12/1957 | Lupfer | 73/359 |
| 3,060,111 | 10/1962 | Sherman et al. | 176/19 R |
| 3,132,077 | 5/1964 | Turovlin | 176/19 R |
| 3,296,864 | 1/1967 | Kealy et al. | 176/19 R |
| 3,610,045 | 10/1971 | Shearman | 136/242 |
| 3,681,990 | 8/1972 | Barrett et al. | 136/230 |
| 3,716,450 | 2/1973 | Lions | 176/19 R |
| 3,763,704 | 10/1973 | Blau et al. | 136/234 |
| 3,862,574 | 1/1975 | Antoine et al. | 73/343 R |

Primary Examiner—Samuel W. Engle
Assistant Examiner—S. A. Cangialosi
Attorney, Agent, or Firm—Edward L. Levine; Z. L. Dermer

[57] ABSTRACT

A receptacle and arrangement for positioning a thermocouple junction in the reactor coolant fluid stream exiting the fuel assemblies of a nuclear reactor.

3 Claims, 4 Drawing Figures

THERMOCOUPLE HOT JUNCTION RECEPTACLE FOR A NUCLEAR REACTOR

BACKGROUND OF THE INVENTION

1. Field of the Invention

This invention provides a receptacle and arrangement for positively seating a thermocouple positioned to provide an indication of reactor coolant fluid temperature exiting the fuel assemblies of a nuclear reactor.

2. Description of the Prior Art

In order to monitor the performance of a core of a nuclear reactor, temperature indicating devices, such as thermocouples, are typically placed within the reactor. The thermocouples pass through conduits which guide the thermocouples through reactor internals components to a position above the core. A plurality of thermocouples so positioned above preselected core locations, or preselected fuel assemblies, provides a temperature profile of the core.

To provide an effective profile, not only must a plurality of thermocouples be utilized, but also the tips, or hot junctions, of the thermocouples must be positioned in the coolant stream as it exits preselected fuel assemblies and before the coolant stream is mixed with coolant from adjacent fuel assemblies. Further, because the thermocouples are exposed to a high temperature, pressure, and flow environment, failures occur necessitating replacement of specific thermocouples. The replacement is typically performed during refueling operations when the reactor upper internals are removed. In the event that the thermocouple tip is not reinserted to its original position, subsequent erroneous temperature indications can occur.

In prior art nuclear reactors, the protective conduits guiding the thermocouples have typically terminated within or about components of the upper internals, such as control element guide tubes or flow mixing devices. Such arrangements not only position the thermocouple junctions an extended distance above the upper core plate which is located above the fuel assemblies, but also do not allow visual inspection of the thermocouple tips to ascertain that they are properly extended into the flowing coolant stream. The latter deficiency is critical because it may result in the aforesaid erroneous temperature indications. Further, the orientation and configuration of the components required to support the thermocouples and their respective conduits impart a pressure drop to the flowing coolant, which it is desirable to minimize.

It is therefore desirable to provide a thermocouple receptacle and arrangement which overcomes the above mentioned deficiencies of the prior art. Such apparatus should provide a positive, repeatable seat for the thermocouples, a close proximity to the fuel assembly exits, a minimum pressure drop, and the ability to perform a visual inspection of thermocouple position to ensure a repeatable and correct indication of core thermal conditions.

SUMMARY OF THE INVENTION

This invention provides a thermocouple junction receptacle and arrangement which overcomes deficiencies of the prior art and provides the desirable characteristics listed above. In the main embodiment the receptacle includes a generally conical surface with a modified apex, such as a flattened or rounded surface. The generally conical receptacle is inverted and affixed to upper internals components, such as a support column, at a location just above a flow opening in the upper core plate, the flow opening being positioned directly above a fuel assembly. The apex of the receptacle is therefore directly in the coolant stream exiting selected fuel assemblies. The conical shape presents a minimum flow resistance, and disperses coolant about its external surface.

An opening penetrates the receptacle from the base to the apex. This opening is of varying cross section through the receptacle, and is sized to seat the protective conduit near the base and positively seat the sheath of the thermocouple near the apex, allowing the hot junction to protrude through the apex a preselected distance. Transitional cross sections of the opening may also be utilized to ensure that the junction and sheath will not bind within the receptacle. The positive seat therefore ensures proper junction position, which may be visually confirmed with the upper internals removed through means such as boroscopes and/or mirrors.

BRIEF DESCRIPTION OF THE DRAWINGS

The functions and advantages of this invention will become more apparent from the following description taken in connection with the accompanying drawings in which.

DESCRIPTION OF THE PREFERRED EMBODIMENTS

Figure 1:
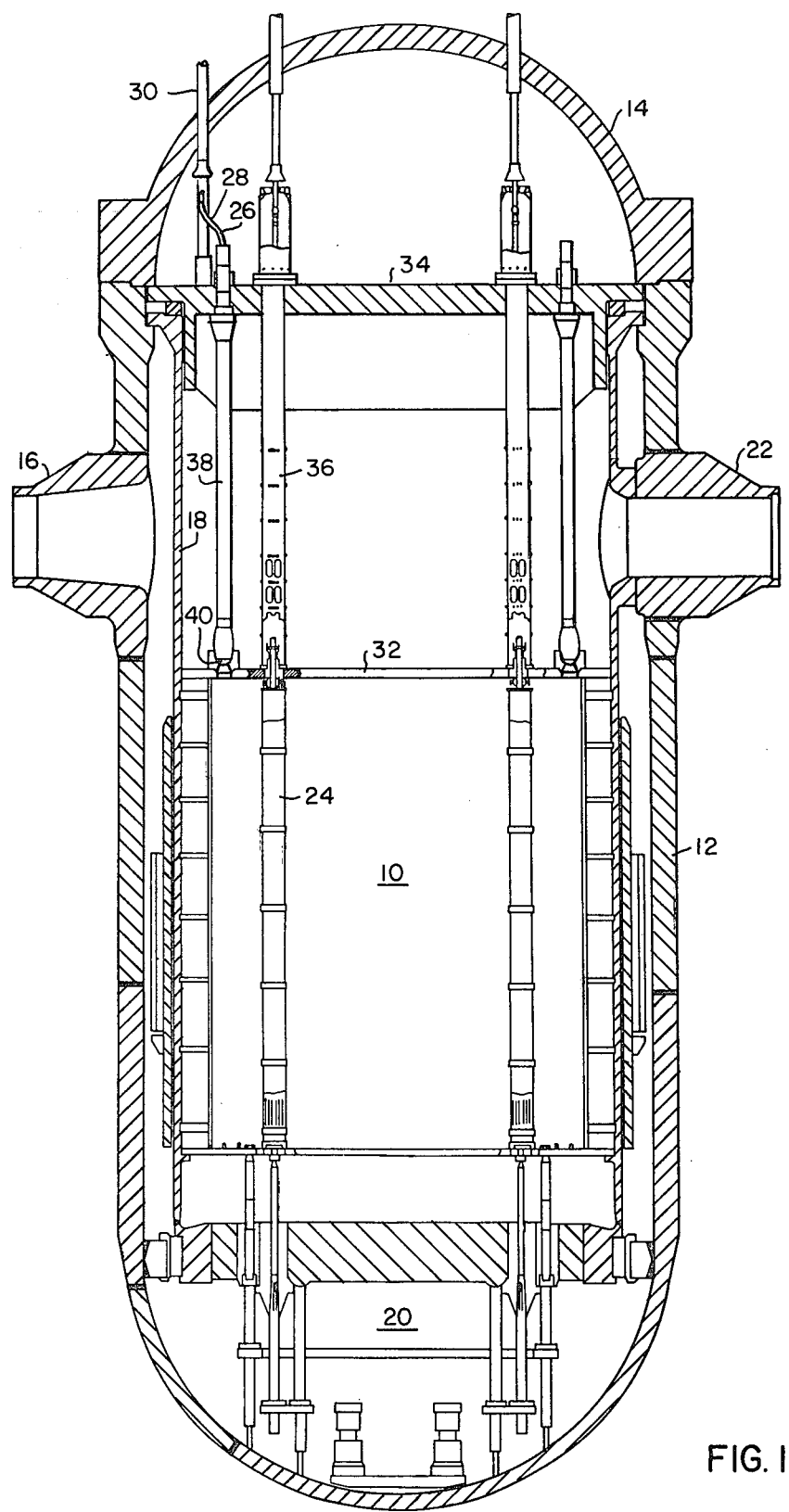
FIG. 1 is an elevation view, in cross section, of a typical nuclear reactor vessel and vessel internals, also incorporating this invention.

Referring now to FIG. 1 there is shown a typical nuclear reactor including a reactor core 10 contained within a pressure vessel 12. The pressure vessel is closed by a vessel head 14 that bolts to the vessel 12. Reactor coolant enters the vessel 12 through a plurality of inlet nozzles 16, passes downwardly between the vessel 12 and core barrel 18, is turned in a lower plenum 20, and passes upward through the core 10. The coolant exits through a plurality of outlet nozzles 22.

The core 10 includes a plurality of fuel assemblies 24 through and about which the reactor coolant flows, absorbing heat energy which is typically utilized to drive turbine-generator apparatus. To provide an indication of thermal conditions within the core 10, a plurality of temperature indicating devices, such as thermocouples 26, are positioned at locations above fuel assemblies 24 at selected core locations. Because of the high temperature, pressure, and flow environment within the vessel 12, each thermocouple 26 is guided to the preselected core location within a thermocouple conduit 28. The conduits 28 enter the vessel 12 through head penetrations 30, and are then routed to the preselected locations, typically terminating in the regions just above an upper core plate 32. The conduits 28 are supported by components of the upper internals, which includes the upper core plate 32, an upper structure 34, guide tubes 36, and support columns 38. This entire upper internals assembly is typically removable in one lift for maintenance or refueling. During reactor shutdowns and refueling operations, the thermocouples 26 may be withdrawn or replaced, by apparatus which grips the thermocouples and remotely inserts or withdraws them from the conduits.

Figure 2:
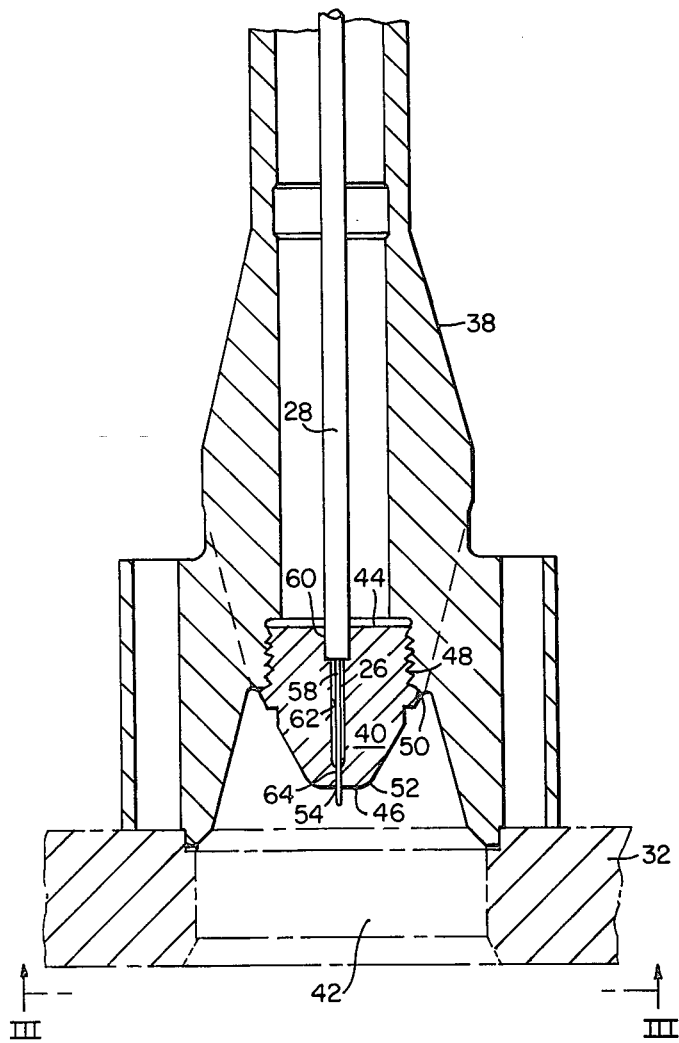
FIG. 2 is an elevation view, in cross section, of an upper internals support column and an affixed thermocouple receptacle of this invention.
Figure 4:
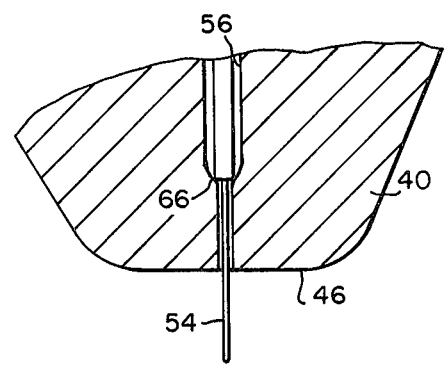
FIG. 4 is an enlarged sectional view of that portion of FIG. 2 illustrating the bottom portion of the thermocouple receptacle.
Figure 3:
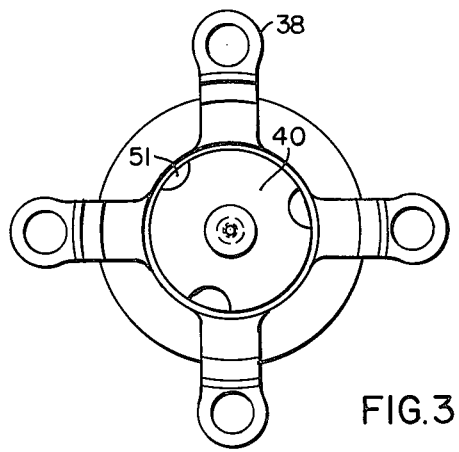
FIG. 3 is a bottom view taken as III—III of FIG. 2.

This invention provides a receptacle 40 for the leading end of the thermocouples 26, which not only ensures a positive seat and proper positioning, but which also allows visual inspection of the seated thermocouples 26 with the upper internals removed. It is applicable to the illustrative and other nuclear reactor types. A receptacle 40 is shown in FIGS. 2 through 4, affixed to a support column 38. The receptacle 40 may also be positioned at other positions, and to other components, in the coolant stream exiting the core 10. The support columns 38 seat above openings 42 in the upper core plate 32, such that coolant exiting the core 10 is directed toward the receptacle 40. The receptacle 40 is generally frustroconical shaped, having a base 44 and a modified, or flattened apex 46. It may be affixed to the support column 38 by various fastening means, including the shown threads 48 and welds 50. Gripping surfaces 51 may also be provided for tooling which grips and inserts the receptacles. The transition 52 at the flattened apex is rounded or chamfered so as not to present an abrupt surface resisting the flow of coolant. The generally conical shape provides a low pressure drop surface that also disperses coolant through the support column 38, and allows the tip 54, or hot junction, of the thermocouple 26 to protrude into the flowing coolant stream without excessive vibration. The tip 54 is to be differentiated from the thermocouple sheath 56, which typically encases the thermocouple wires except for the tip 54.

The receptacle 40 also includes an opening 58 from the base 44 to the flattened apex 46. The opening 58 is of varying cross section along its length to receive and seat the thermocouple 26 and its protective conduit 28. The cross section of the opening 58 is preferably circular, although other configurations may be utilized. The varying sections include a conduit dimension 60, sized to receive the conduit 28. The conduit 28 is permanently affixed to the receptacle by means such as welding. A sheath dimension 62 is smaller than the conduit dimension, so as to provide a seat for the conduit 28, and is sized to loosely receive the sheath 56. A tip dimension 64 is smaller than the sheath dimension 62, and is sized to receive the tip 54 and interfere with the sheath 56. A transition region 66 may also be incorporated between adjacent cross sections, to guide the components through the receptacle 40.

The configuration as described advantageously provides a positive seat for the thermocouples at the core exit, minimum interference with reactor coolant flow, and visual inspection with the upper internals removed. To replace a thermocouple, gripping apparatus such as jacking tools can be used to remotely insert and seat a thermocouple. The receptacle 40 configuration of this invention ensures proper seating such that the thermocouple tip 54 will protrude beyond the receptacle flattened apex 46 only by a predetermined amount. A thermocouple 26 will not bind in the receptacle 40, and further, visual inspection may be performed through means such as underwater mirrors or boroscopes, as the upper internals are typically kept beneath a water shield.

It will be apparent that many modifications and additions are possible in view of the above teachings. It therefore is to be understood that within the scope of the appended claims, the invention may be practiced other than as specifically described.

What we claim is:

1. A receptacle to seat a thermocouple within the reactor vessel and above the core of a nuclear reactor, said thermocouple including a sheath and a hot junction of smaller cross section than said sheath protruding therefrom, said thermocouple disposed within a conduit that penetrates said reactor vessel and terminates within said receptacle, said receptacle comprising a generally inverted conical surface with a flattened apex and a base and an opening vertically through said receptacle intersecting said flattened apex and base, said opening having decreasing lateral areas along its length, said areas serially including a first area sized to receive said conduit through said base, a second smaller area within said receptacle sized to removably receive said sheath and interfere with said conduit, and a third yet smaller area sized to removably receive said hot junction and interfere with said sheath, said third cross section extending to said apex and having a shorter length than said hot junction, whereby said hot junction protrudes beyond said apex.

2. The receptacle of claim 1 wherein said opening further includes a continuously decreasing transition area between said second and third areas.

3. A nuclear reactor including a pressure vessel enclosing a plurality of longitudinally extending fuel assemblies and an upper internals structure, said structure including thermocouple conduits to protect and guide thermocouples to selected positions above said fuel assemblies, said thermocouples each including a sheath and a hot junction of smaller cross section than said sheath protruding therefrom, an upper core plate with perforations disposed atop said assemblies, and columns affixed to and extending upward from said plate above preselected perforations, at least some of said columns including a thermocouple receptacle affixed thereto at about the elevation of said upper core plate, said receptacle comprising an inverted generally conical surface with a base and a truncated apex and an opening extending vertically through said receptacle between said base and said apex, said opening having varying lateral areas throughout its length sized to positively seat said thermocouple, said opening serially including, from said base to said apex, a first lateral area sized to matingly receive said conduit, a second smaller lateral area sized to loosely receive said sheath and interfere with said conduit, and a third yet smaller lateral area sized to removably receive said hot junction and interfere with said sheath, the length of said third lateral area being shorter than the length of said hot junction by a predetermined amount.

* * * * *